United States Patent

Sugahara et al.

(10) Patent No.: US 9,399,828 B2
(45) Date of Patent: *Jul. 26, 2016

(54) METHOD AND APPARATUS FOR EXTRACTING AND REMOVING RARE EARTH METAL IONS FROM PLATING SOLUTION

(71) Applicant: Shin-Etsu Chemical Co., Ltd., Tokyo (JP)

(72) Inventors: Hiroto Sugahara, Echizen (JP); Takehisa Minowa, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,206

(22) Filed: Apr. 6, 2015

(65) Prior Publication Data

US 2015/0284872 A1    Oct. 8, 2015

(30) Foreign Application Priority Data

Apr. 7, 2014  (JP) .................................. 2014-078642

(51) Int. Cl.
*C25D 21/18*    (2006.01)
*B01D 11/04*   (2006.01)
*C22B 59/00*   (2006.01)

(52) U.S. Cl.
CPC ................ *C25D 21/18* (2013.01); *B01D 11/04* (2013.01); *C22B 59/00* (2013.01)

(58) Field of Classification Search
CPC ..... C25D 21/18; B01D 11/04; B01D 11/0492
USPC ............................ 106/1.27; 422/257; 205/99
See application file for complete search history.

(56) References Cited

U.S. PATENT DOCUMENTS

| | | | | |
|---|---|---|---|---|
| 5,338,520 A | * | 8/1994 | Leveque | C01F 17/0006 423/21.1 |
| 8,177,881 B2 | * | 5/2012 | Sugahara | C22B 3/0022 423/21.5 |
| 8,202,431 B2 | * | 6/2012 | Werner | C25D 21/22 205/99 |
| 8,802,040 B2 | * | 8/2014 | Sugahara | C01F 17/0006 423/21.5 |
| 2013/0183208 A1 | * | 7/2013 | Sugahara | B01D 11/04 422/256 |

FOREIGN PATENT DOCUMENTS

| | | |
|---|---|---|
| EP | 2 537 576 A1 | 12/2012 |
| EP | 2 614 868 A1 | 7/2013 |

(Continued)

OTHER PUBLICATIONS

English abstract of JP 07/034300; Feb. 1995; 2 pages.*

(Continued)

*Primary Examiner* — Helene Klemanski
(74) *Attorney, Agent, or Firm* — Westerman, Hattori, Daniels & Adrian, LLP

(57) ABSTRACT

In an extraction tank, a plating solution containing rare earth metal ions is treated with an extracting solution of an extractant in a water-insoluble organic solvent. Extraction treatment is carried out by atomizing the extracting solution through a lower nozzle into the plating solution in the tank lower zone, and atomizing the plating solution through an upper nozzle into the extracting solution in the tank upper zone, for thereby bringing the plating solution in contact with the extracting solution to extract rare earth metal ions from the plating solution into the extractant for removal.

8 Claims, 2 Drawing Sheets

(56) References Cited

FOREIGN PATENT DOCUMENTS

| JP | 3-119545 A | | 5/1991 |
|---|---|---|---|
| JP | 07/034300 | * | 2/1995 |

OTHER PUBLICATIONS

Extended European Search Report dated Aug. 24, 2015, issued in counterpart application No. 15162557.1 (5 pages).

* cited by examiner

METHOD AND APPARATUS FOR EXTRACTING AND REMOVING RARE EARTH METAL IONS FROM PLATING SOLUTION

CROSS-REFERENCE TO RELATED APPLICATION

This non-provisional application claims priority under 35 U.S.C. §119(a) on Patent Application No. 2014-078642 filed in Japan on Apr. 7, 2014, the entire contents of which are hereby incorporated by reference.

TECHNICAL FIELD

This invention relates to a method and apparatus for extracting and removing rare earth metal ions from a plating solution, typically nickel electroplating solution, in which rare earth metal ions such as Nd and Dy have accumulated as impurities.

BACKGROUND ART

In the prior art, it is a common practice to apply plating, typically nickel electroplating to the surface of rare earth magnets, typically Nd—Fe—B permanent magnets, for the purpose of imparting corrosion resistance thereto. While the plating bath is used over a long term, rare earth metal ions are leached out of the rare earth magnets, i.e., work to be plated and gradually accumulate in the plating bath, adversely affecting plating quality.

In particular, the nickel electroplating bath is sensitive to impurities. Even traces of impurities, if introduced, can incur detrimental phenomena such as adhesion failure, covering power shortage, and hard brittle coatings. Impurities are composed of fine solids suspended in the plating bath or settled on the plating tank bottom and soluble impurities dissolved in the plating bath. Fine solid impurities may be removed by a physical removal method, typically filtration. Of the soluble impurities dissolved in the plating bath, some transition metals may be removed by effecting dummy electrolysis with a low current flow for allowing impurity metal ions to deposit on the cathode. Rare earth metal ions, however, are quite difficult to remove.

For removal of rare earth metal ions such as Nd and Dy in the nickel electroplating bath as impurities, Patent Document 1 proposes a method involving adding less than equivalent of an extractant to the nickel plating bath, mixing and agitating until the extractant is associated with rare earth metal ions to form an associated gel, separating and removing the associated gel from the plating bath, and recovering the plating bath for reuse.

This method, however, has many problems. If more than equivalent of the extractant is added, the extractant does not gel. Then separation is difficult. Complete removal of rare earth metal impurities such as Nd and Dy is impossible. This indicates that expensive rare earth metals such as Nd and Dy are discarded, and the extractant is also discarded. There is left an industrial waste in gel form, which may be accepted by few waste disposal facilities and hardly treated in an industrially acceptable manner. The operation of withdrawing the gel waste poses a burden to the worker.

CITATION LIST

Patent Document 1: JP 3119545

DISCLOSURE OF INVENTION

An object of the invention is to provide a method and apparatus for extracting and removing rare earth metal ion impurities from a plating solution without leaving an industrial waste, such that rare earth metal components such as Nd and Dy may be recycled.

In one aspect, the invention provides a method for extracting and removing rare earth metal ions from a plating solution in an extraction tank using an extracting solution, the extraction tank including a lower zone filled with the plating solution and an upper zone filled with the extracting solution, the plating solution containing rare earth metal ions as impurities, the extracting solution containing an extractant in a water-insoluble organic solvent and having a lower specific gravity than the plating solution. The method comprises the steps of atomizing the extracting solution from a lower position in the extraction tank, into the plating solution in the tank lower zone, and atomizing the plating solution from an upper position in the extraction tank, into the extracting solution in the tank upper zone, for thereby bringing the plating solution in contact with the extracting solution to extract rare earth metal ions from the plating solution into the extractant for removal.

In a preferred embodiment, the step of atomizing the solution in an atomized fashion includes atomizing the solution through a spray nozzle or full-cone nozzle.

Most often, the plating solution is a nickel plating solution.

In a preferred embodiment, a vertical partition is disposed in the extraction tank to divide into two compartments, extraction compartment and stationary compartment, a lower portion of the partition is provided with a passage for communication of the plating solution between the compartments, and an upper portion of the partition is provided with another passage for communication of the extracting solution between the compartments.

In a preferred embodiment, the extraction tank is provided with an outlet for discharging the plating solution from which rare earth metal ions have been extracted and another outlet for discharging the extracting solution having rare earth metal ions extracted therein.

In another aspect, the invention provides an apparatus for extracting and removing rare earth metal ions from a plating solution containing rare earth metal ions as impurities, using an extracting solution of an extractant in a water-insoluble organic solvent having a lower specific gravity than water, said apparatus comprising an extraction tank, a plating solution feed line fitted at a distal end with a spray or full-cone nozzle, the spray or full-cone nozzle at the distal end of the plating solution feed line being positioned in an upper zone of the extraction tank, and an extracting solution feed line fitted at a distal end with a spray or full-cone nozzle, the spray or full-cone nozzle at the distal end of the extracting solution feed line being positioned in a lower zone of the extraction tank, wherein the extracting solution is atomized from the spray or full-cone nozzle at the distal end of the extracting solution feed line into the tank lower zone so as to flow upward, and the plating solution is atomized from the spray or full-cone nozzle at the distal end of the plating solution feed line into the tank upper zone so as to flow downward, for thereby bringing the plating solution in contact with the extracting solution.

Preferably, the apparatus further comprises a vertical partition disposed in the extraction tank to divide into two compartments, extraction compartment and stationary compartment, a passage provided in a lower portion of the partition for communication of the plating solution between the compartments, and another passage provided in an upper portion of the partition for communication of the extracting solution between the compartments.

Also preferably, the apparatus further comprises an outlet provided in the extraction tank for discharging the plating solution from which rare earth metal ions have been extracted, and another outlet provided in the extraction tank for discharging the extracting solution having rare earth metal ions extracted therein.

The method for extracting and removing rare earth metal ions from a plating solution according to the invention is a treatment method of dispersing atomized solutions without a need for an agitating machine. Specifically, the extraction tank is filled with the plating solution and the extracting solution of an extractant in a water-insoluble organic solvent. The extracting solution is atomized preferably through a spray or full-cone nozzle and injected in the tank at a lower position while the plating solution is atomized preferably through a spray or full-cone nozzle and injected in the tank at an upper position. The atomized extracting solution having a lower specific gravity moves upward whereas the atomized plating solution having a higher specific gravity moves downward. During upward and downward movements, the extracting and plating solutions are brought in mutual contact. Upon contact, extraction reaction takes place at the water/oil interface having an increased surface area by virtue of atomization, leading to efficient metal extraction.

Since no agitation operation is involved in the extraction reaction, a uniform water/oil mixed phase (i.e., emulsion phase) is not formed throughout the system, and phase separation is definite. This enables to increase the throughput and allows for efficient removal of rare earth metal ions such as Nd and Dy. Additionally, the extracted rare earth metals may be recycled by back-extraction via similar dropwise contact with an acid such as hydrochloric acid, preferably using a spray or full-cone nozzle. The use of the inventive apparatus enables a saving of industrial waste disposal expense and reuse of extractant and rare earth metals.

Advantageous Effects of the Invention

A comparison of the plating solution before and after the extraction treatment indicates that it is possible that rare earth metal components are completely (100%) extracted without affecting plating solution ingredients. The extractant can be repetitively used via back extraction without gelation and discard. The back extraction ensures that expensive rare earth metals such as Nd and Dy are recycled without a loss by discard. The operation of withdrawing the gelled metal-extractant compound is unnecessary. Since the plating solution after treatment is substantially free of rare earth metal ions such as Nd and Dy (in a low concentration if any), it may be reused in plating of stable quality.

DESCRIPTION OF PREFERRED EMBODIMENTS

Figure 1:
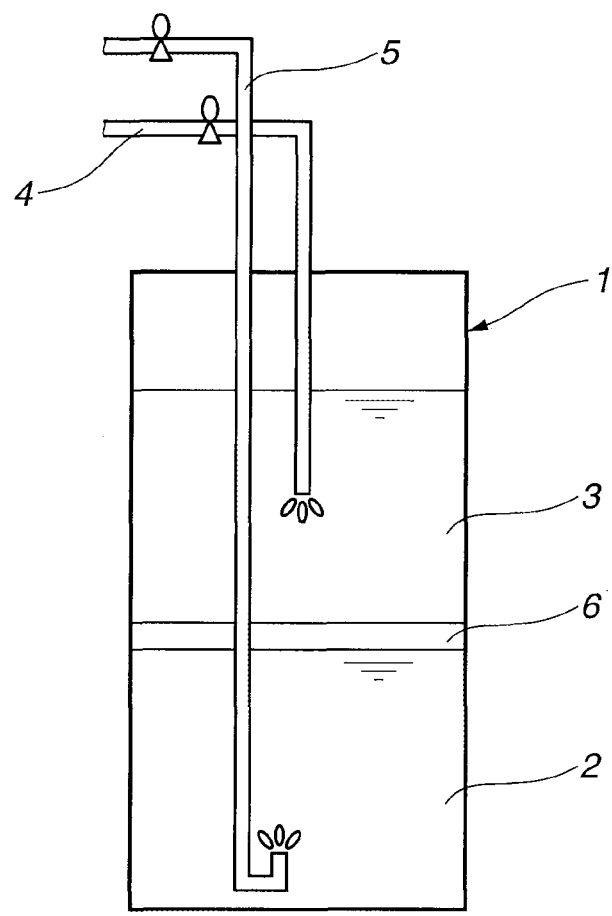
FIG. 1 is a schematic cross-zoneal view of an extraction apparatus in one embodiment of the invention.

The invention is directed to a method for extracting and removing rare earth metal ions from a plating solution containing rare earth metal ions as impurities. Although the plating solution to be treated is not particularly limited, it is commonly selected from plating solutions for imparting corrosion resistance to rare earth magnets, typically Nd—Fe—B permanent magnets, such as nickel, copper and chromium electroplating solutions. A nickel electroplating solution, commonly known as Watts nickel bath, is typical. The composition of the nickel plating bath is not particularly limited, while the bath may be either a dull, semi-bright, or bright plating bath.

The rare earth metal ions to be removed vary depending on a particular rare earth magnet to be plated, and include Pr, Nd, Tb, Dy and the like in the case of Nd—Fe—B permanent magnets.

In the case of a nickel plating solution, for example, detrimental phenomena such as covering power shortage, adhesion failure, blister and peeling may occur if noticeable amounts of rare earth metal ions accumulate. It is then recommended to carry out the rare earth extraction/removal method of the invention whenever the total concentration of rare earth metal ions in the nickel plating solution reaches 500 ppm or higher, especially 1,000 ppm or higher. It is, of course, acceptable to carry out the inventive method before the concentration reaches the indicated level.

The extraction/removal method of the invention is a method for extracting and removing rare earth metal ions from a plating solution in an extraction tank using an extracting solution. The extraction tank includes a lower zone filled with the plating solution and an upper zone filled with the extracting solution. The plating solution contains rare earth metal ions as impurities. The extracting solution contains an extractant dissolved in a water-insoluble organic solvent and has a lower specific gravity than the plating solution. In the method, the extracting solution is atomized at a lower position in the extraction tank, typically through a spray or full-cone nozzle, into the plating solution in the tank lower zone, and the plating solution is atomized at an upper position in the extraction tank, typically through a spray or full-cone nozzle, into the extracting solution in the tank upper zone. Double atomization and ensuing upward/downward flows bring the plating solution in contact with the extracting solution to extract rare earth metal ions from the plating solution into the extractant for removal.

As the extractant, any desired compound may be used herein as long as it does not extract or react with main metal ions such as nickel in the plating solution, but can extract rare earth metal ions. Suitable extractants include di-2-ethylhexylphosphoric acid, mono-2-ethylhexyl 2-ethylhexylphosponate (trade name PC-88A), and carboxylic acid extractants (trade name versatic acid 10 or VA-10). The organic solvent in which the extractant is dissolved is not particularly limited as long as it is water insoluble and has a lower specific gravity than water. Suitable solvents include kerosine, dodecane, toluene and hexane. The concentration of the extractant in the organic solvent is preferably 0.5 to 2.5 mol/l, more preferably 1 to 2 mol/l, though not limited thereto.

Referring to FIG. 1, the inventive apparatus is described in detail. The apparatus comprises an extraction tank 1 which includes a lower zone filled with a lower layer 2 of the plating solution and an upper zone filled with an upper layer 3 of the extracting solution having a lower specific gravity than the plating solution. A plating solution feed line 4 fitted at a distal end with a nozzle for atomizing liquid as droplets, preferably spray nozzle or full-cone nozzle, is extended into the tank 1 such that the nozzle at the distal end of the feed line may be positioned in the upper layer of extracting solution 3. The plating solution containing rare earth metal ions is fed through the feed line 4 and atomized downward from the nozzle into the upper layer of extracting solution 3. An extracting solution feed line 5 fitted at a distal end with a nozzle for atomizing liquid as droplets, preferably spray nozzle or full-cone nozzle, is extended into the tank 1 such that the nozzle at the distal end of the feed line may be positioned in the lower layer of plating solution 2. The extracting solution is fed through the feed line 5 and atomized upward from the nozzle into the lower layer of plating solution 2. A mixing zone of the atomized plating solution and the atomized extracting solution is depicted at 6.

With respect to the filling of the tank with the plating solution layer 2 and the extracting solution layer 3, the tank 1 may be previously filled with predetermined volumes of the solutions prior to the start of atomization or spray injection of the solutions. Alternatively, the tank may be gradually filled with increasing volumes of the solutions by the atomization or spray injection of the solutions. In case where the tank 1 is previously filled with the plating solution layer, the plating solution is preferably a plating solution from which rare earth metal ions have been extracted and removed.

The atomization or spray injection of the plating and extracting solutions ensures efficient contact of the plating solution with the extractant whereby rare earth metal ions are extracted and removed from the plating solution.

According to the invention, water-and-oil is atomized or emulsified by means of an atomizing nozzle, preferably spray nozzle or full-cone nozzle, without using an agitating machine, whereby extraction reaction is carried out. Mixing and phase separation can be simultaneously accomplished within a common tank, ensuring definite phase separation.

When a spray nozzle is used as the atomizing nozzle, the flow rate of plating solution injected through the spray nozzle is preferably 3 to 10 L/min, more preferably 4 to 6 L/min, and the flow rate of extracting solution injected through the spray nozzle is preferably 0.1 to 5 L/min, more preferably 0.5 to 2 L/min. The amount in equivalent of the extractant used is preferably at least 10 times the total amount in equivalent of rare earth metal ions in the plating solution. When the plating or extracting solution is atomized through the spray nozzle, the droplets preferably have a diameter of 300 to 4,000 μm, more preferably 500 to 3,000 μm.

A full-cone nozzle may be used instead of the spray nozzle. When a full-cone nozzle is used as the atomizing nozzle, the flow rate of plating solution injected through the full-cone nozzle is preferably 3 to 10 L/min, more preferably 4 to 6 L/min, and the flow rate of extracting solution injected through the full-cone nozzle is preferably 0.1 to 5 L/min, more preferably 0.5 to 2 L/min. The amount in equivalent of the extractant used is preferably at least 10 times the total amount in equivalent of rare earth metal ions in the plating solution. When the plating or extracting solution is atomized through the full-cone nozzle, the droplets preferably have a diameter of 300 to 4,000 μm, more preferably 500 to 3,000 μm.

Figure 2:
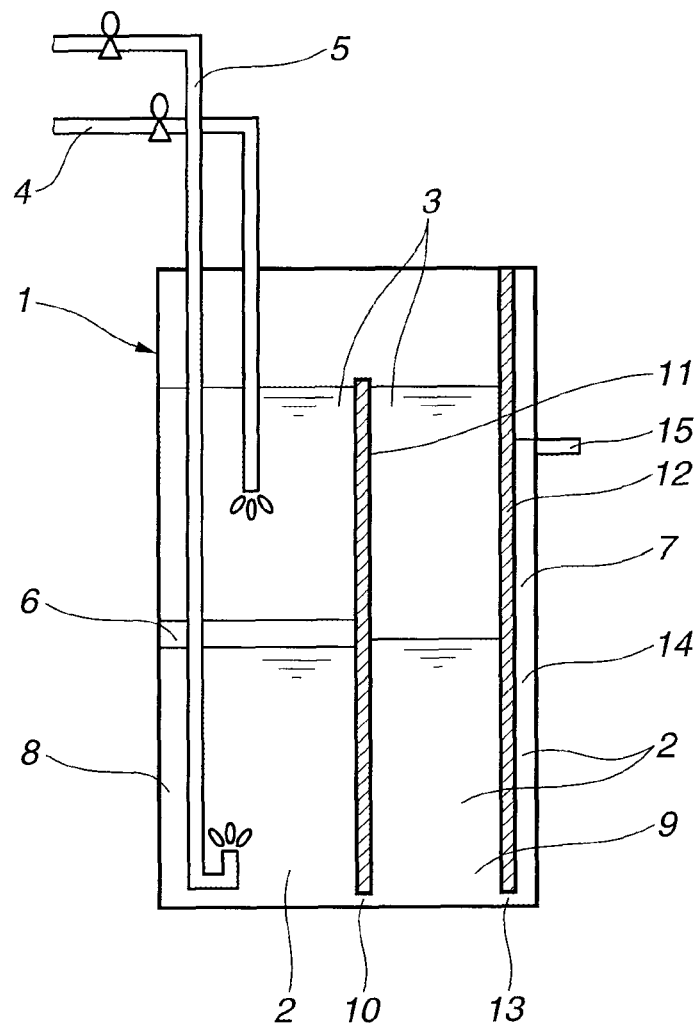
FIG. 2 is a schematic cross-zoneal view of an extraction apparatus in another embodiment of the invention.

FIG. 2 illustrates the extraction apparatus in another embodiment of the invention. A vertical partition 7 is disposed in the extraction tank 1 to divide the tank into two compartments, extraction compartment 8 and stationary compartment 9. In the extraction compartment 8, the plating solution feed line 4 and the extracting solution feed line 5 are extended as in the previous embodiment and extraction treatment is similarly carried out. A passage 10 is provided in a lower portion of the partition 7 for communication of the plating solution between the compartments 8 and 9. In FIG. 2, the lower end of the partition 7 is spaced apart from the bottom of the tank 1 to define the passage 10. Accordingly, the plating solution which is treated in the extraction compartment 8 (i.e., from which rare earth metal ions have been extracted and removed) passes through the passage 10 into the stationary compartment 9 so that the compartment 9 is filled with the plating solution. Another passage 11 is provided in an upper portion of the partition 7 for communication of the extracting solution between the compartments 8 and 9. The other passage 11 is typically formed as one or more ports extending throughout the partition 7. The extracting solution passes from the extraction compartment 8 into the stationary compartment 9 through the other passage 11. Then the stationary compartment 9 is also filled with the lower layer of plating solution 2 and the upper layer of extracting solution 3 in a separated manner. In the stationary compartment 9, however, no mixing zone is formed at the interface between the plating solution layer 2 and the extracting solution layer 3.

Further, as shown in FIG. 2, another vertical partition 12 is disposed in the stationary compartment 9 near one side wall of the tank 1. The lower end of the other partition 12 is spaced apart from the bottom of the tank 1 to define a gap 13 for communication of the treated plating solution. The other partition 12 is spaced apart from the side wall of the tank 1 to define a channel 14 for the treated plating solution. The side wall of the tank 1 is provided with an outlet 15 for the treated plating solution. The treated plating solution in the stationary compartment 9 passes through the gap 13 into the channel 14 and flows upward in the channel 14, whereupon it is discharged through the outlet 15 for recovery. Another side wall of the tank 1 defining the stationary compartment 9 is provided with another outlet (not shown) for the extracting solution. The extracting solution having rare earth metal ions extracted and retained therein in the stationary compartment 9 is discharged through the other outlet for recovery.

After recovery, the treated plating solution is in reusable conditions and may be fed back to a plating tank (not shown). On the other hand, after recovery, the extracting solution having rare earth metal ions extracted and retained therein may be subjected to back extraction for recovering the rare earth metals. The back extraction treatment may be carried out in an apparatus similar to FIGS. 1 and 2, by bringing the extracting solution in contact with a rare earth metal dissolving agent, e.g., hydrochloric acid, nitric acid or sulfuric acid for dissolving the rare earth metals in the dissolving agent, and separating the dissolving agent from the water-insoluble organic solvent containing the extractant.

EXAMPLE

Examples of the invention are given below by way of illustration and not by way of limitation.

Example 1

From a nickel plating solution containing rare earth metal ions as impurities, rare earth metal ions were extracted and removed under the following conditions.
   Extraction tank volume: 100 L
   Plating solution: nickel plating solution (Watts bath), 500 L
   Extracting solution: 1.5N di-2-ethylhexylphosphoric acid in kerosene, 50 L
   Plating solution flow rate: 5 L/min
   Extracting solution flow rate: 1 L/min
   Diameter of water/oil droplets atomized from spray nozzles: 500-900 μm Table 1 shows the concentration of main ingredients in the plating solution before and after the extraction treatment, as measured by neutralization titration method.

TABLE 1

|  | Nickel chloride | Nickel sulfate | Boric acid |
|---|---|---|---|
| Before treatment (g/L) | 70.2 | 272.0 | 46.7 |
| After treatment (g/L) | 70.2 | 272.0 | 46.7 |

As seen from Table 1, the main ingredients in the plating solution were not affected by the extraction treatment.

Table 2 shows the concentration of rare earth elements in the plating solution before and after the extraction treatment, as measured by ICP emission spectrometry.

TABLE 2

|  | Pr | Nd | Tb | Dy |
|---|---|---|---|---|
| Before treatment (ppm) | 31.8 | 532.1 | 2.9 | 55.6 |
| After treatment (ppm) | 0.0 | 0.0 | 0.0 | 0.0 |

As seen from Table 2, the rare earth metal components (Pr, Nd, Tb, Dy) in the plating solution were completely extracted.

Next, the extracting solution having the rare earth metals extracted therein was contacted with 5.5N hydrochloric acid for back extraction.

Back Extraction Conditions
Extraction tank volume: 100 L
Back-extractant: 5.5N HCl
Extracting solution: 1.5N di-2-ethylhexylphosphoric acid in kerosene, 50 L
HCl solution flow rate: 5 L/min
Extracting solution flow rate: 5 L/min
Diameter of water/oil droplets atomized from spray nozzles: 500-900 μm Table 3 shows the concentration of rare earth elements in the extracting solution after the back extraction with hydrochloric acid.

TABLE 3

|  | Pr | Nd | Tb | Dy |
|---|---|---|---|---|
| After treatment (ppm) | 0.0 | 0.0 | 0.0 | 0.0 |

By the back extraction via extractant/hydrochloric acid contact using spray nozzles, the rare earth elements once extracted in the extractant were completely back extracted in hydrochloric acid so that the extractant might be recycled.

Example 2

From a nickel plating solution containing rare earth metal ions as impurities, rare earth metal ions were extracted and removed under the following conditions.

Extraction tank volume: 100 L
Plating solution: nickel plating solution (Watts bath), 500 L
Extracting solution: 1.5N di-2-ethylhexylphosphoric acid in kerosene, 50 L
Plating solution flow rate: 5 L/min
Extracting solution flow rate: 1 L/min
Diameter of water/oil droplets atomized from full-cone nozzles: 500-1,000 μm Table 4 shows the concentration of main ingredients in the plating solution before and after the extraction treatment, as measured by neutralization titration method.

TABLE 4

|  | Nickel chloride | Nickel sulfate | Boric acid |
|---|---|---|---|
| Before treatment (g/L) | 70.2 | 272.0 | 46.7 |
| After treatment (g/L) | 70.2 | 272.0 | 46.7 |

As seen from Table 4, the main ingredients in the plating solution were not affected by the extraction treatment.

Table 5 shows the concentration of rare earth elements in the plating solution before and after the extraction treatment, as measured by ICP emission spectrometry.

TABLE 5

|  | Pr | Nd | Tb | Dy |
|---|---|---|---|---|
| Before treatment (ppm) | 31.8 | 532.1 | 2.9 | 55.6 |
| After treatment (ppm) | 0.0 | 0.0 | 0.0 | 0.0 |

As seen from Table 5, the rare earth metal components (Pr, Nd, Tb, Dy) in the plating solution were completely extracted.

Next, the extracting solution having the rare earth metals extracted therein was contacted with 5.5N hydrochloric acid for back extraction.

Back Extraction Conditions
Extraction tank volume: 100 L
Back-extractant: 5.5N HCl
Extracting solution: 1.5N di-2-ethylhexylphosphoric acid in kerosene, 50 L
HCl solution flow rate: 5 L/min
Extracting solution flow rate: 5 L/min
Diameter of water/oil droplets atomized from full-cone nozzles: 500-1,000 μm Table 6 shows the concentration of rare earth elements in the extracting solution after the back extraction with hydrochloric acid.

TABLE 6

|  | Pr | Nd | Tb | Dy |
|---|---|---|---|---|
| After treatment (ppm) | 0.0 | 0.0 | 0.0 | 0.0 |

By the back extraction via extractant/hydrochloric acid contact using full-cone nozzles, the rare earth elements once extracted in the extractant were completely back extracted in hydrochloric acid so that the extractant might be recycled.

Comparative Example 1

Test Conditions
Plating solution: nickel plating solution (Watts bath), 500 L
Extracting solution: 1.5N di-2-ethylhexylphosphoric acid in kerosene, 5 L The plating solution and the extracting solution were mixed and agitated at 500 rpm for 1 hour.

Table 7 shows the concentration of main ingredients in the plating solution before and after the extraction treatment, as measured by neutralization titration method.

TABLE 7

|  | Nickel chloride | Nickel sulfate | Boric acid |
|---|---|---|---|
| Before treatment (g/L) | 70.2 | 272.0 | 46.7 |
| After treatment (g/L) | 70.2 | 272.0 | 46.7 |

As seen from Table 7, the main ingredients in the plating solution were not affected.

Table 8 shows the concentration of rare earth elements in the plating solution before and after the extraction treatment, as measured by ICP emission spectrometry.

TABLE 8

|  | Pr | Nd | Tb | Dy |
|---|---|---|---|---|
| Before treatment (ppm) | 31.8 | 532.1 | 2.9 | 55.6 |
| After treatment (ppm) | 1.2 | 93.0 | 0.0 | 2.3 |

As seen from Table 8, of the rare earth metal components, 1.2 ppm of Pr, 93.0 ppm of Nd, and 2.3 ppm of Dy were not extracted and left in the plating solution. The extractant-rare earth metal compounds in gel form were discarded.

Comparative Example 2

Test Conditions
Extraction tank volume: 100 L
Plating solution: nickel plating solution (Watts bath), 500 L
Extracting solution: 1.5N di-2-ethylhexylphosphoric acid in kerosene, 50 L
Plating solution flow rate: 5 L/min
Extracting solution flow rate: 1 L/min
Diameter of water/oil droplets atomized from full-cone nozzles: 50-300 μm Under the conditions of Comparative Example 2, the diameter of water/oil droplets was extremely fine. As a result, phase separation was unsatisfactory, that is, a large fraction of oil was introduced into the plating solution recovered. The test was interrupted.

Japanese Patent Application No. 2014-078642 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for extracting and removing rare earth metal ions from a plating solution in an extraction tank using an extracting solution, the extraction tank including a lower zone filled with the plating solution and an upper zone filled with the extracting solution, the plating solution containing rare earth metal ions as impurities, the extracting solution containing an extractant in a water-insoluble organic solvent and having a lower specific gravity than the plating solution, said method comprising the steps of:
   atomizing the extracting solution from a lower position in the extraction tank, into the plating solution in the tank lower zone, and
   atomizing the plating solution from an upper position in the extraction tank, into the extracting solution in the tank upper zone,
   for thereby bringing the plating solution in contact with the extracting solution to extract rare earth metal ions from the plating solution into the extractant for removal.

2. The method of claim 1 wherein the step of atomizing the solution in an atomized fashion includes atomizing the solution through a spray nozzle or full-cone nozzle.

3. The method of claim 1 wherein the plating solution is a nickel plating solution.

4. The method of claim 1, wherein a vertical partition is disposed in the extraction tank to divide into two compartments, extraction compartment and stationary compartment,
   a lower portion of the partition being provided with a passage for communication of the plating solution between the compartments,
   an upper portion of the partition being provided with another passage for communication of the extracting solution between the compartments.

5. The method of claim 1 wherein the extraction tank is provided with an outlet for discharging the plating solution from which rare earth metal ions have been extracted and another outlet for discharging the extracting solution having rare earth metal ions extracted therein.

6. An apparatus for extracting and removing rare earth metal ions from a plating solution containing rare earth metal ions as impurities, using an extracting solution of an extractant in a water-insoluble organic solvent having a lower specific gravity than water, said apparatus comprising
   an extraction tank,
   a plating solution feed line fitted at a distal end with a spray or full-cone nozzle, the spray or full-cone nozzle at the distal end of the plating solution feed line being positioned in an upper zone of the extraction tank, and
   an extracting solution feed line fitted at a distal end with a spray or full-cone nozzle, the spray or full-cone nozzle at the distal end of the extracting solution feed line being positioned in a lower zone of the extraction tank,
   wherein the extracting solution is atomized from the spray or full-cone nozzle at the distal end of the extracting solution feed line into the tank lower zone so as to flow upward, and the plating solution is atomized from the spray or full-cone nozzle at the distal end of the plating solution feed line into the tank upper zone so as to flow downward, for thereby bringing the plating solution in contact with the extracting solution.

7. The apparatus of claim 6, further comprising
   a vertical partition disposed in the extraction tank to divide into two compartments, extraction compartment and stationary compartment,
   a passage provided in a lower portion of the partition for communication of the plating solution between the compartments, and
   another passage provided in an upper portion of the partition for communication of the extracting solution between the compartments.

8. The apparatus of claim 6, further comprising
   an outlet provided in the extraction tank for discharging the plating solution from which rare earth metal ions have been extracted, and
   another outlet provided in the extraction tank for discharging the extracting solution having rare earth metal ions extracted therein.

* * * * *